US012377530B2

(12) United States Patent
Gurule

(10) Patent No.: US 12,377,530 B2
(45) Date of Patent: Aug. 5, 2025

(54) POCKET BRUSH AND TOOL HOLDER

(71) Applicant: Randy Fabian Gurule, Grand Terrace, CA (US)

(72) Inventor: Randy Fabian Gurule, Grand Terrace, CA (US)

( * ) Notice: Subject to any disclaimer, the term of this patent is extended or adjusted under 35 U.S.C. 154(b) by 384 days.

(21) Appl. No.: 18/136,615

(22) Filed: Apr. 19, 2023

(65) Prior Publication Data

US 2023/0405795 A1 Dec. 21, 2023

Related U.S. Application Data

(60) Provisional application No. 63/353,763, filed on Jun. 20, 2022.

(51) Int. Cl.

| | |
|---|---|
| ***B25G 1/06*** | (2006.01) |
| ***A46B 17/02*** | (2006.01) |
| ***B25G 1/04*** | (2006.01) |
| ***B25G 3/20*** | (2006.01) |

(52) U.S. Cl.
CPC ................ *B25G 1/06* (2013.01); *A46B 17/02* (2013.01); *B25G 3/20* (2013.01); *B25G 1/04* (2013.01)

(58) Field of Classification Search
CPC ... A46B 17/02; A46B 7/042; A46B 2200/202; B25G 1/04; B25G 1/06; B25G 3/20; B25G 3/38; B25G 3/30; B25G 3/28; B25G 3/26; B25G 3/24; B25G 3/18; B25B 9/04
See application file for complete search history.

(56) References Cited

U.S. PATENT DOCUMENTS

| | | | | |
|---|---|---|---|---|
| 1,467,046 | A | 1/1892 | Myers | |
| 1,592,838 | A | 11/1897 | Solem | |
| 1,599,273 | A | 9/1926 | Benkosky et al. | |
| 2,469,050 | A | 5/1949 | Mygas | |
| 2,792,581 | A * | 5/1957 | Woyton | A46B 17/02 403/162 |
| 3,319,280 | A | 5/1967 | Trachsler | |
| 3,994,037 | A | 11/1976 | Sims | |
| 4,127,296 | A * | 11/1978 | Thomson | B05C 21/00 248/113 |
| 4,525,889 | A | 7/1985 | Dunau | |
| D299,693 | S * | 2/1989 | Wick | D8/396 |
| 5,502,859 | A * | 4/1996 | Kim | A46B 5/0083 403/53 |
| D396,755 | S * | 8/1998 | Lennox | D4/199 |
| D456,147 | S | 4/2002 | Anderson | |
| 8,572,796 | B2 * | 11/2013 | Major | A46B 5/0095 492/19 |

(Continued)

*Primary Examiner* — David B. Thomas
(74) *Attorney, Agent, or Firm* — Kirk A. Buhler; Buhler & Associates Patenting

(57) ABSTRACT

Improvements in a pocket brush and tool holder for brushes and tools to hold a paint brush, scraping tool, a utility knife, a dusting brush, and marking tool or other tools for elevated, lowered or difficult-to-reach can be dangerous or require a ladder or other equipment. The holder uses clamping faces with springs that open the faces to allow for easier insertion of the tool within the clamping faces. Wingnuts are used on the threaded fasteners to draw the clamping faces together and allow for high clamping forces. The head angle can be adjusted and locked into position using teeth or detents on the rotating head to prevent undesired rotation when high forces are placed on the clamped tool.

20 Claims, 4 Drawing Sheets

(56) References Cited

U.S. PATENT DOCUMENTS

| | | | | |
|---|---|---|---|---|
| 8,839,480 | B2 | 9/2014 | Thomas | |
| 9,289,895 | B1 | 3/2016 | Bauer | |
| 11,179,842 | B2 * | 11/2021 | Newman | B25G 3/26 |
| 11,794,328 | B2 * | 10/2023 | Newman | A46B 5/0083 |
| 11,986,937 | B2 * | 5/2024 | Wetrich | B25H 1/0021 |
| 12,186,883 | B2 * | 1/2025 | Cobián-Méndez | A47L 13/38 |
| 2011/0271488 | A1 * | 11/2011 | Swinderman | B25G 1/04<br>16/421 |
| 2020/0254603 | A1 * | 8/2020 | Murrow, Jr. | B25G 3/38 |
| 2024/0001528 | A1 * | 1/2024 | Newman | A46B 5/0075 |

* cited by examiner

POCKET BRUSH AND TOOL HOLDER

CROSS-REFERENCE TO RELATED APPLICATIONS

This application claims the benefit of Provisional Application Ser. No. 63/353,763 filed Jun. 20, 2022,

PRIOR ART

U.S. Pat. No. 2,469,050 issued on May 3, 1949, to N. Mygas and is titled Articulating Handle for Paint Brushes and the Like. This patent discloses an adjustable holder for brushes to permit the handle of the brush to be held at an angle with respect to a hand brap to permit a painter to conveniently hold the brush and paint angularly related to the surface being painted. While this patent is for an adjustable holder, it is only for brushes and relies on friction to set the angle of the brush.

U.S. Pat. No. 3,994,037 issued on Nov. 30, 1976, to Alex Sims and is titled Brush Extension Arm. This patent discloses an adjustable extension for a brush which enables the operator to cover difficult to reach areas. The brush is positional in a plurality of fixed angles for ease of working with the same. While this patent is for a brush holder, it does not hold tools and requires removal of the pole to change the angle of the brush.

U.S. Pat. No. 9,289,895 issued on Mar. 22, 2016, to Martin C. Bauer and is titled Adapter for Extending a Tool Handle. This patent discloses an adapter for mounting a tool on an extension handle, and the adapter may be elongated with a proximal end and a distal end with a longitudinal axis extending between the distal and proximal ends. The adapter may comprise a socket portion located toward the proximal end and being configured to mount on the extension shaft, and a mounting portion located toward the distal end and being configured to removably receive a portion of the handle of the tool. While this patent is for a paintbrush extension holder it does not allow for changes an angle of the brush and is not configured for holding a tool.

What is needed is a tool holder that is configured to mount to a threaded painting pole, can be adjusted to a variety of angles and can hold brushes and hand tools. The. holder for brushes and tools disclosed in this document provides the solution.

BACKGROUND OF THE INVENTION

This invention relates to improvements in a tool holder. More particularly, the pocket brush and tool holder creates a versatile holder that can firmly hold a large variety of tools at various angles. Often a painter needs to paint at an elevated location or at a location that is difficult to reach. This can also be the case for using a scraping tool, a utility knife, a dusting brush, and marking tool or another tool. For using brush or tool the tool can be secured to a holder and then the tool holder connected to a common painter's pole. This allows the painter or worker to reach the elevated location or the difficult to reach location without using a ladder or placing the worker in a dangerous position. Several patents and or publications have been made to address these issues. Exemplary examples of patents and or publication that try to address this/these problem(s) are identified and discussed herein.

SUMMARY OF THE INVENTION

It is an object of the pocket brush and tool holder to hold a paint brush, scraping tool, a utility knife, dusting brush, and marking tool or another tool. The ability to firmly hold a large variety of tools makes the holder versatile for a large number of uses in different industries where reaching an elevated, lowered or difficult-to-reach can be dangerous or require a ladder or other equipment. The holding a tool can also be used in chemically hazardous conditions where a user can work at an extended distance from the hazard.

It is an object of the pocket brush and tool holder to include two clamping faces. The clamping faces can be secured in a parallel relationship or at an angled relationship where the handle of the tool is tapered. The clamping faces could have one or more recesses or friction surfaces to further increase the gipping force for holding a tool.

It is an object of the pocket brush and tool holder to use springs to spread the two clamping faces. The springs are retained around threaded fasteners and force the clamping faces open to allow for easier insertion of the tool within the clamping faces. Wingnuts are used on the threaded fasteners to draw the clamping faces together and allow for high clamping forces. This is particularly useful when the tool requires high forces like a scrapper.

It is an object of the pocket brush and tool holder to fit onto the threaded end of a painting extension pole. Extension poles tend to have a standard thread to allow for connection of a dusting brush. The holder uses the same thread pitch and size to allow for a quick change from a dusting brush to the desired tool.

It is another object of the pocket brush and tool holder for the head to have an adjustable angle. The adjustable angle allows the user to set the angle of the tool based upon their needs and the optimal angle for the required task. For example, the angle for painting along a ceiling is usually different from the angle of a brush for painting a vertical corner. The angle can be quickly adjusted using a similar threaded screw and wingnut as previously described.

It is still another object of the pocket brush and tool holder for the adjustable angle to be set and adjusted with detents or teeth. The use of detents or teeth ensure that the set angle will not change under high forces that might loosen a frictional clamp.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
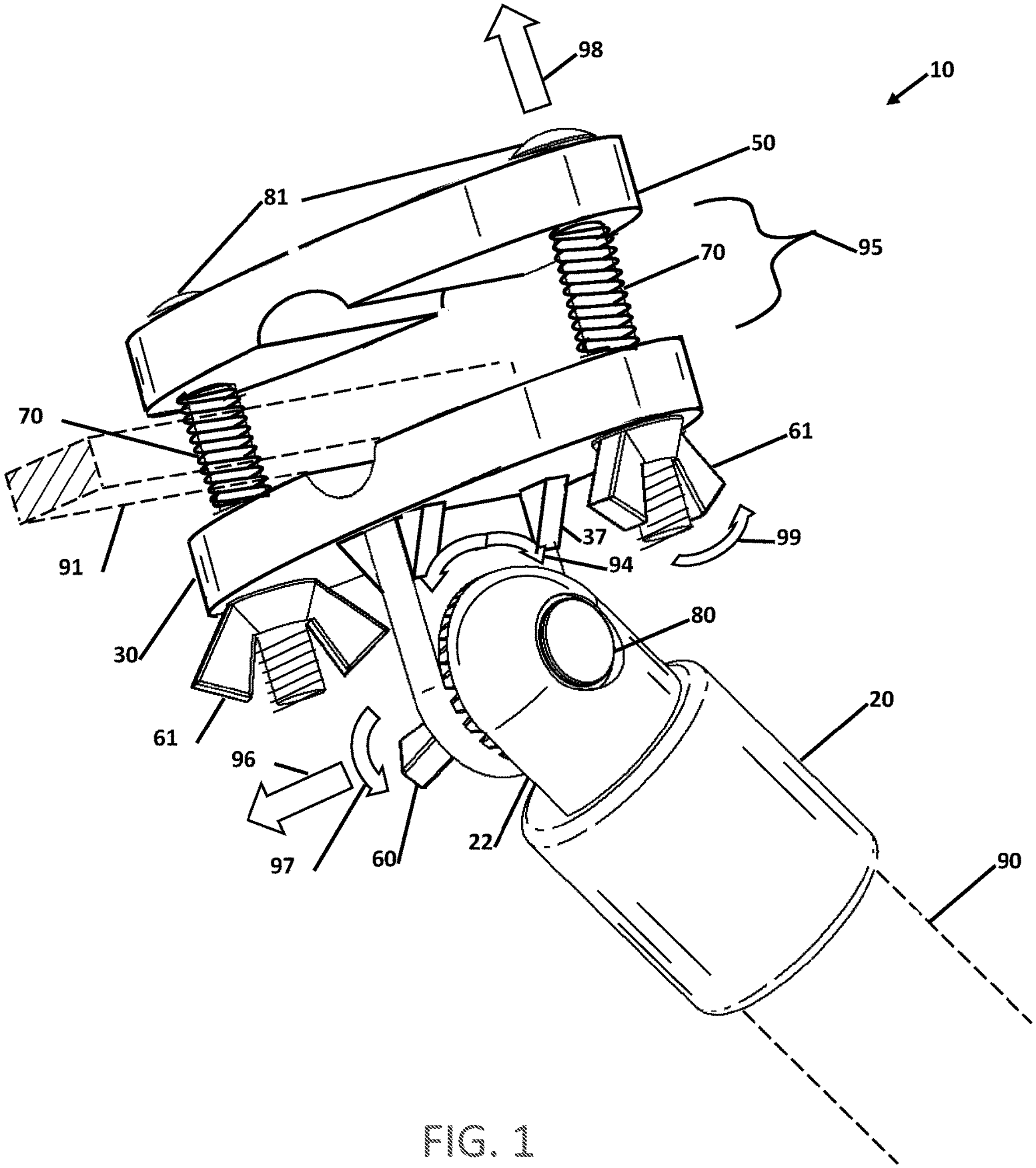
FIG. 1 shows a perspective view of the pocket brush and tool holder with a scraper tool.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

| Item Numbers and Description | |
|---|---|
| 10 holder for brushes and tools | 20 pole receiver |
| 21 threaded hole | 22 head |
| 23 spring recess | 24 teeth |
| 25 square recess | 30 head base |
| 31 teeth | 32 head |
| 33 hole | 34 spring recess |
| 35 lower recess | 36 hole |
| 37 gusset | 50 head cap |
| 51 hole | 52 upper recess |
| 52A alternate recess | 53 square opening |
| 60 wingnut | 61 wingnut |
| 70 spring | 71 spring |
| 80 threaded fastener | 81 threaded fastener |
| 82 head | 83 square neck |
| 90 extension pole | 91 tool |
| 94 rotate | 95 opening |
| 96 out | 97 turned |
| 98 open | 99 turned |

FIG. 1 shows a perspective view of the pocket brush and tool holder 10 with a portion of a scraper tool 91 handle. While this figure shows an oval or rectangular shaped tool 91 handle nearly and handle that can fit within the opening 95 can be clamped and retained between the head base 30 and the head cap 50 within the holder for brushes and tools 10. One or more gussets 37 can be used between the head base and the head 32. Starting at the bottom of this figure the holder for brushes and tools 10 is shown connected to an extension pole 90. Extension poles 90 are commonly used with paint rollers to allows a user to reach locations above or below the painter while the painter stands. Most extension poles 90 use a male ¾"-5 ACME thread, and the inside of the first end of the pole receiver 20 has a female ¾"-5 ACME female thread to accept the male threaded end of the extension pole 90.

At a second end of the pole receiver 20 is a rounded head 22 with a threaded fastener 80 that passes through the rounded head 22. The threaded fastener passes through a complementary rounded head of at a first end of the head base 30. A nut or wingnut 60 is secured to the threaded end of the threaded fastener 80. The wingnut 60 can be turned 97 to loosen, to move out 96 the connection between pole receiver 20 and the head base 30. This will allow the head base 30 to rotate 94 on the pole receiver When the desired angular position is achieved the wingnut 60 is tightened onto the threaded fastener 80 to lock the rotated orientation. At a second end of the head base is a flat surface with a curved recess where a tool handle can be located. A pair of threaded fasteners 81 pass through the head cap 50 into the second end of the head base 30.

Between the head cap 50, the head base 30 and around the threaded fasteners 81 are extension springs 70. The extension spring 81 increase the opening 95 between the head cap 50 into the second end of the head base 30 when the wingnuts 61 are turned 99 to open 98 or raise the head cap 50 relative to the head base 30. The wingnuts 61 can be turned 99 separately or together to move the head cap 50 into the second end of the head base 30 in a parallel or a non-parallel relationship to grip a tool 91 that may have a taper.

Figure 2:
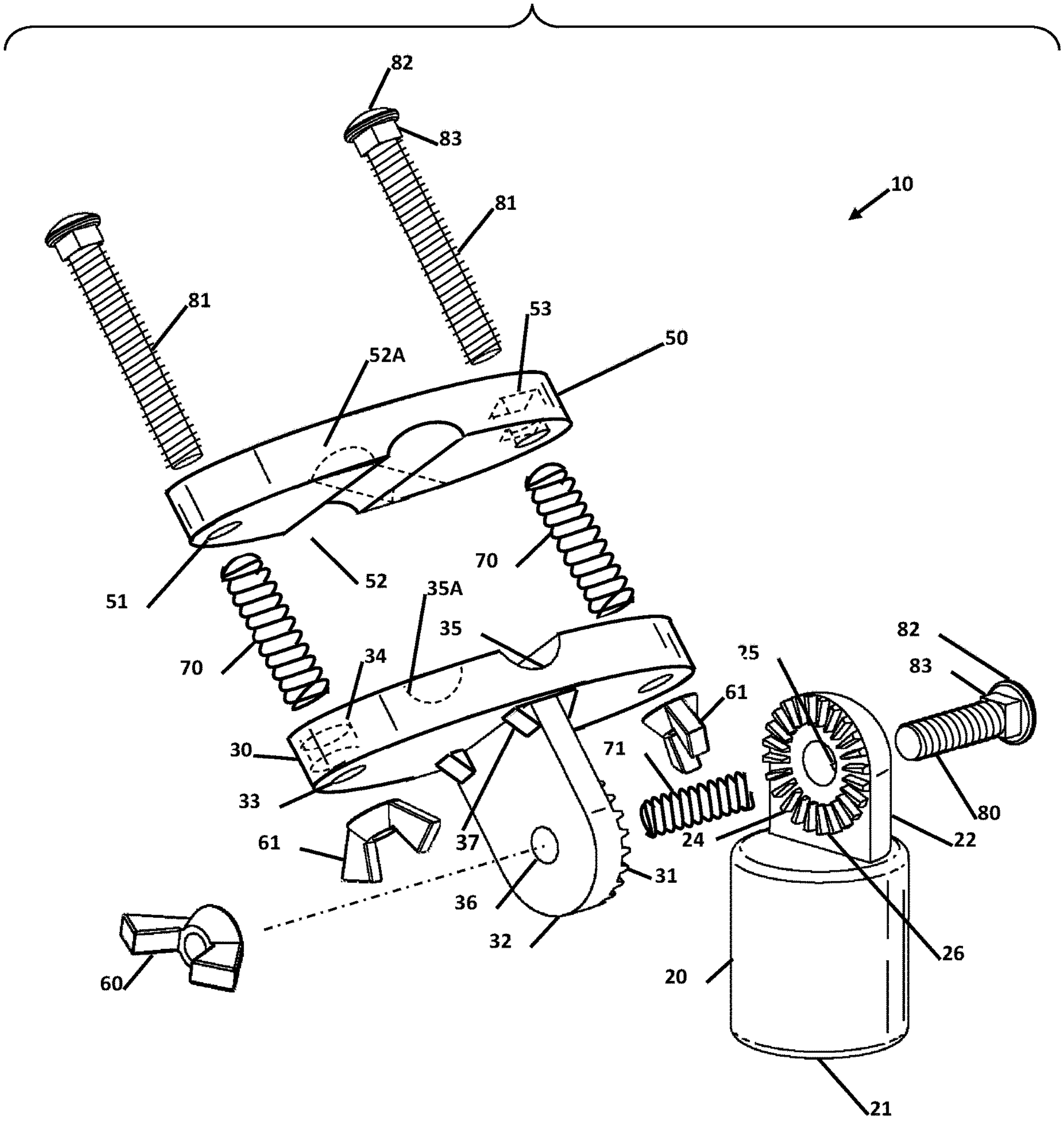
FIG. 2 shows an exploded view of the pocket brush and tool holder.

FIG. 2 shows an exploded view of the pocket brush and tool holder 10. This figure shows the components separately and provides some details regarding some elements of the holder for brushes and tools 10 that may not be visible when the holder for brushes and tools 10 is assembled and holding a tool 10. Starting at the upper end of this figure the two threaded fasteners 81 are shown. These threaded fasteners 81 are shown as carriage bolts or square neck 83 bolts, they could be bolts with hex heads, slotted heads, Philips head or hex key heads. The use of a carriage bolt allows for tightening the wingnut(s) 61 without requiring a tool to prevent the head 82 of the threaded fastener 81 to freely turn. The top of the head cap 50 is shown with hole(s) 51 with square opening(s) 53 for the square neck 83 of the threaded faster to engage and prevent the threaded fastener 81 from turning.

The spring(s) 70 are shown between the head base 30 and the head cap 50 so the threaded fasteners 81 can pass therethrough hole(s) 33 and 51, respectively. On one side of the head base 30 a clearance spring recess 34 is shown. The spring recess 34 allows for the spring 70 to completely compress within the spring recess 34 so the facing surfaces of the head cap 50 and the head base 30 can be brought together. The spring(s) 70 help to hold the head cap 50 and the head base 30 apart, thereby making it easier to insert a tool between the head cap 50 and the head base 30. One or more gussets 37 can be used between the head base 30 and the head 32.

The facing surfaces of the head cap 50 and the head base 30 are shown with complementary upper recess 52 and lower recess 35. These recesses 35/52 allow for curved or rounded portions of a tool to be centered and gripped. While the recesses 35/52 are shown centered between the threaded fasteners 81, it is contemplated that the recesses 35A/52A could be placed at an angle to provide additional securing locations and angles. It is also contemplated that the facing surfaces of the head cap 50 and the head base 30 could be textured, have an elastomeric coating or have a high friction surface to increase a gripping force. This is particularly useful when a scraper is placed within the holder and used to scrape a surface.

The head 32 and the head 22 are shown separated so the teeth 31 and 24, respectively, are visible. The teeth 31/24 allow for clocking and locking the position of the head base 30 relative to the pole receiver 20. There are at least three teeth. In one preferred embodiment the teeth 31/24 are located at 15-degree increments. While increments are a preferred embodiment the increments are contemplated at between 5 degrees and 30 degrees. In another embodiment the teeth 31/24 can be removed to allow for an infinite number of angular positions for the head base 30 relative to the pole receiver 20.

A spring 71 is shown between the head 32 and the head 22 so the threaded fastener 80 can pass therethrough the hole 36. On one side of the head 22 a clearance spring recess 26 is shown. The spring recess 26 allows for the spring 71 to completely compress within the spring recess 26 so the facing surfaces of the head 32 and the head 22 can be brought together to engage the teeth 24/31. The spring 71 helps to hold the head 32 and the head 22 apart, thereby making it easier to rotate the head 32 relative to the head 22.

The threaded fasteners 80 is shown as carriage bolts or square neck 83 bolts, they could be bolts with hex heads, slotted heads, Philips head or hex key heads. The use of a carriage bolt allows for tightening the wingnut 60 without requiring a tool to prevent the head 82 of the threaded fastener 80 to freely turn. The outer curved surface of the head 22 is shown with a hole with square recess 25 for the square neck 83 of the threaded faster 80 to engage and prevent the threaded fastener 80 from turning. At the bottom of the pole receiver 20 is a bottom opening or threaded hole 21 for to receive an extension pole (not shown). The threaded hole is shown and described in other figures herein.

Figure 3:
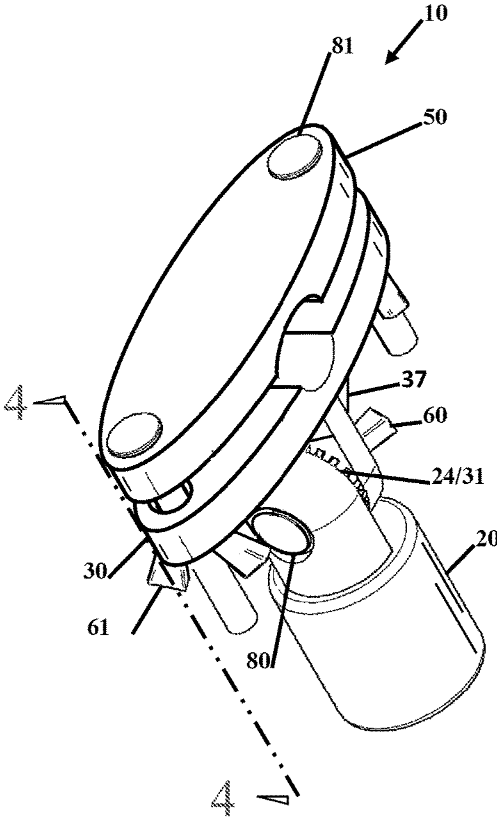
FIG. 3 shows a first preferred embodiment of the h pocket brush and tool holder.
Figure 4:
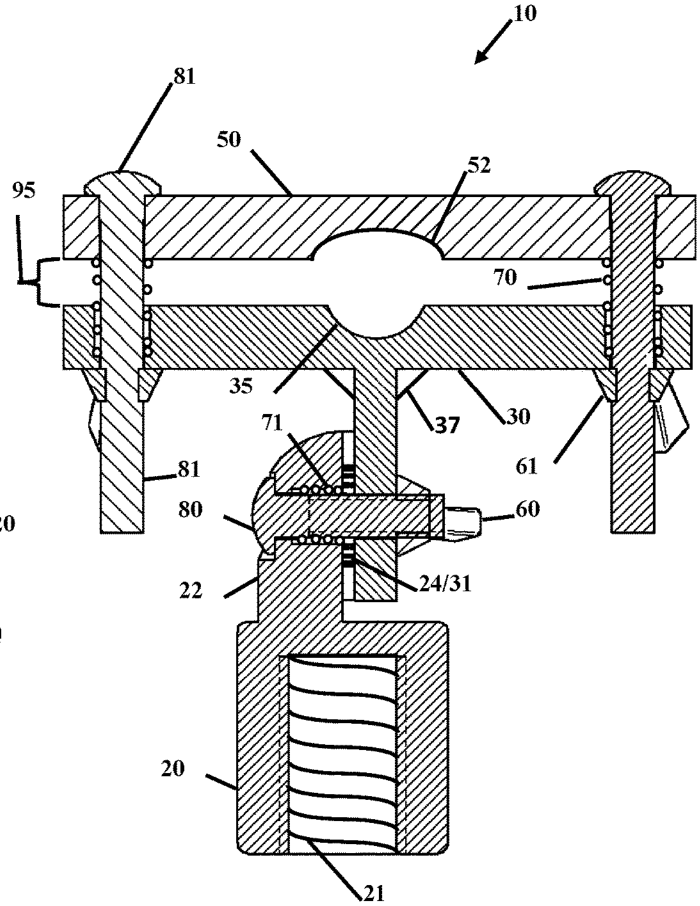
FIG. 4 shows a cross-sectional view of the pocket brush and tool holder taken from 4-4 in FIG. 3.

FIG. 3 shows a first preferred embodiment of the pocket brush and tool holder and FIG. 4 shows a cross-sectional view of the pocket brush and tool holder 10 taken from 4-4 in FIG. 3. Starting from the bottom of these figures the pole receiver 20 is shown with the threaded hole 21. In the preferred embodiment the threaded hole 21 is a female ¾"-5 ACME female thread to accept the male threaded end of the extension pole (not shown). While this thread diameter and pitch is shown and described, the threaded hole 21 could be a different diameter and/or pitch. At the top of the pole receiver 20 is the head 22. The cross-section of the head is shown with the threaded fastener 80 passing through the head 22, through the lower portion of the head base 30 and secured with a wingnut 60. One or more gussets 37 can be used between the head base 30 and the head 32. The teeth 24/31 are shown engaged together to prevent rotation of the head base 30 relative to the pole receiver 20. The rotation is between 5 degrees and 60 degrees. The spring 71 is shown in a compressed condition around the threaded fastener 80 between the head 22 and the lower portion of the head base 30.

Also, in the cross-section the threaded fasteners 81 are shown passing through the head cap 50 and through the head base 30 and secured with a wingnut 61. While wingnuts 60 and 61 are shown and described other types and styles f nut are contemplated. Springs 70 are shown in a semi-compressed condition around the threaded fasteners 81. In the preferred embodiment the threaded fasteners are ¼ "-20 threaded fasteners, but other diameters and pitch are contemplated based upon the design/use requirements. The upper recess 52 and the lower recess 35 are shown to allow for gripping a tool or brush. While rounded recess are shown the recesses 35/52 could take a variety of diameters and shapes including, but not limited to oblong, oval, square, hexagonal and rectangular.

Figure 5:
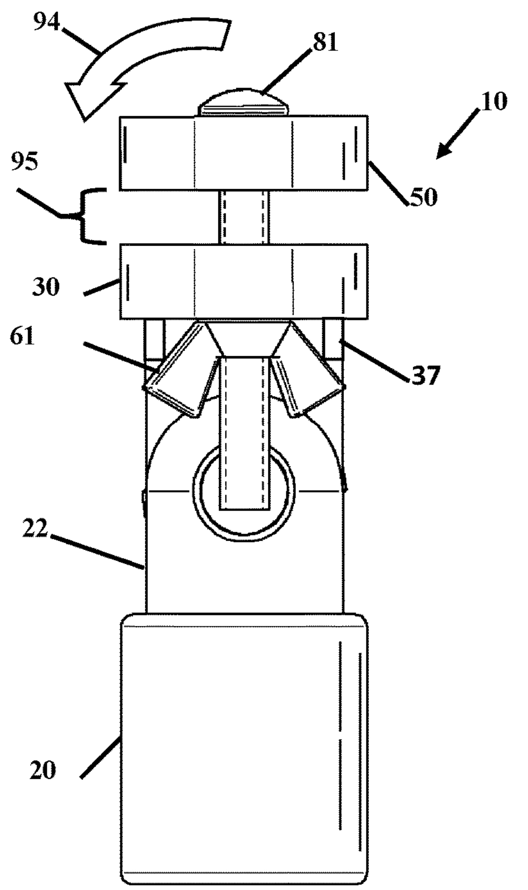
FIG. 5 shows a side view of the h pocket brush and tool holder.
Figure 6:
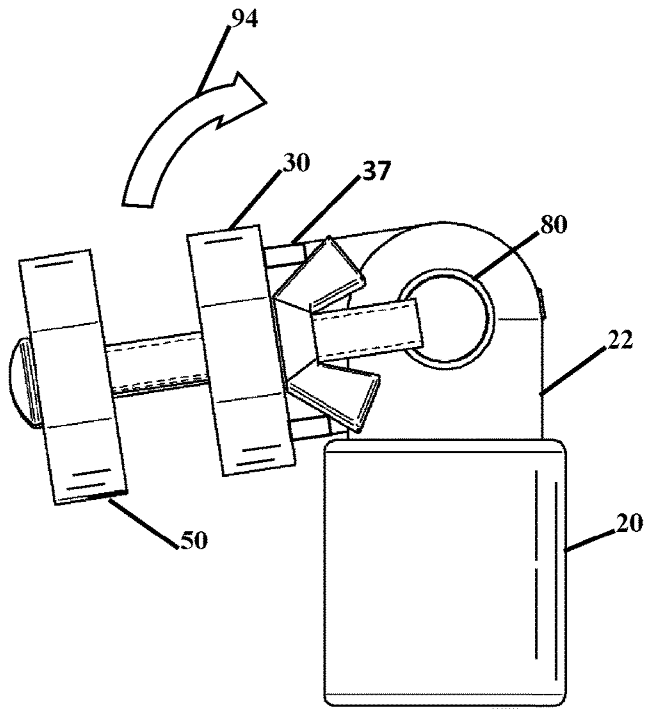
FIG. 6 shows a side view of the pocket brush and tool holder with the top portion rotated to an extreme position.

FIG. 5 shows a side view of the pocket brush and tool holder 10 and FIG. 6 shows a side view of the holder for brushes and tools 10 with the top portion rotated 94 to an extreme position. To change the angle of the head 30 relative to the pole receiver 20 the wingnut on the other side of the threaded faster 80 is loosened. The head 30, and secured head base 50, are collectively rotated. FIG. 6 shows an extreme rotation 94 from vertical. The rotation 94 from vertical in this figure is about 105 degrees. Other increments from vertical can be set, and the head 30, and secured head base 50, can be rotated from vertical on the other side from vertical of the pole receiver 20.

In the preferred embodiment, teeth (not shown in this figure) are located at 15-degree increments. While 15-degree increments are a preferred embodiment the increments are contemplated at between 5 degrees and 30 degrees. In another embodiment the teeth (not shown in this figure) can be removed to allow for an infinite number of angular positions for the head base 30 relative to the pole receiver 20. One or more gussets 37 can be used between the head base 30 and the head 32. To alter the opening 95, wingnuts 61 are loosened and springs around the threaded fasteners 81 will push apart the head cap 50 from the head base 30 to increase the opening 95 this will allow a brush or other tool to be placed between the head cap 50 from the head base 30. The wingnuts 61 can then be tightened to bring the head cap 50 closer to the head base 30 and clamp the brush or tool therein between.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing embodiments only and is not intended to be limiting of the technology. As used herein, the singular forms "a," "an," and "the" are intended to include the plural forms as well, unless the context clearly indicates otherwise.

Thus, specific embodiments of a pocket brush and tool holder have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A pocket brush and tool holder comprising:

a pole receiver;

said pole receiver having a first end with a threaded hole that is configured to receive an extension pole;

said pole receiver having a second end with a pole receiver head with a hole therethrough for a first fastener;

a head base having a first end with a hole therethrough for said first fastener, said head base having a second end with a lower recess that is configured to grip a tool;

said second end of said head base having a plurality of openings configured to receive threaded fasteners therethrough;

a head cap having a plurality of openings that are configured to accept said threaded fasteners to pass therethrough;

a plurality of fasteners; and, a plurality of springs;

wherein, the plurality of springs are positioned between said second end of said head base and said head cap and configured to move said head cap away from said second end of said head base.

2. The pocket brush and tool holder according to claim 1, further includes a plurality of teeth between said pole receiver and said first end of said head base that provide finite rotation of said pole receiver and said first end of said head base.

3. The pocket brush and tool holder according to claim 2, wherein said plurality of teeth is at least three teeth.

4. The pocket brush and tool holder according to claim 2, wherein said plurality of teeth provide finite rotation is between 5 degrees and 60 degrees.

5. The pocket brush and tool holder according to claim 2, further includes a tooth spring between said pole receiver and said first end of said head base that is configured to move said head base relative to said pole receiver.

6. The pocket brush and tool holder according to claim 5, wherein said tooth spring move said head base relative to said pole receiver to provide clearance of said plurality of teeth between said head base and said pole receiver extends.

7. The pocket brush and tool holder according to claim 1, wherein said first fastener is a carriage bolt.

8. The pocket brush and tool holder according to claim 7, wherein said pole receiver has a square opening to accept said first fastener and prevent rotation of said first fastener.

9. The pocket brush and tool holder according to claim 1, wherein said threaded fasteners are carriage bolts.

10. The pocket brush and tool holder according to claim 9, wherein said plurality of openings in said head cap have square openings to accept said carriage bolts and prevent rotation of said carriage bolts.

11. The pocket brush and tool holder according to claim 1, wherein there are at least two lower recesses.

12. The pocket brush and tool holder according to claim 1, wherein said head cap has at least one head cap recess that is configured to grip said tool.

13. The pocket brush and tool holder according to claim 1, wherein said tool is a paint brush, a scraping tool, a utility knife, a dusting brush, or a marking tool.

14. The pocket brush and tool holder according to claim 1, wherein said threaded hole is a female ¾"-5 ACME female thread.

15. The pocket brush and tool holder according to claim 1, wherein said head base and said head cap have an oval shape.

16. The pocket brush and tool holder according to claim 1, wherein said head base and said head cap have a shape other than an oval shape.

17. The pocket brush and tool holder according to claim 1, wherein said pole receiver further includes at least one gusset between said first end and said second end.

18. The pocket brush and tool holder according to claim 1, wherein said first fastener is secured with a wing nut.

19. The pocket brush and tool holder according to claim 1, wherein said threaded fasteners are secured with wing nuts.

20. The pocket brush and tool holder according to claim 1, wherein said threaded fasteners are independently adjustable to allow for an angle between said head base and said head cap.

* * * * *